(12) United States Patent
Kormuth et al.

(10) Patent No.: US 6,944,254 B2
(45) Date of Patent: Sep. 13, 2005

(54) PRESSURIZED WATER REACTOR SHUTDOWN METHOD

(75) Inventors: Joseph W. Kormuth, Charleroi, PA (US); William A. Byers, Murrysville, PA (US); Richard D. Reid, Kennewick, WA (US); George P. Sabol, Murrysville, PA (US)

(73) Assignee: Westinghouse Electric Co., LLC, Pittsburgh, PA (US)

( * ) Notice: Subject to any disclaimer, the term of this patent is extended or adjusted under 35 U.S.C. 154(b) by 81 days.

(21) Appl. No.: 10/630,056

(22) Filed: Jul. 30, 2003

(65) Prior Publication Data

US 2005/0105670 A1 May 19, 2005

Related U.S. Application Data

(60) Provisional application No. 60/408,729, filed on Sep. 6, 2002, and provisional application No. 60/409,175, filed on Sep. 9, 2002.

(51) Int. Cl.$^7$ .................................................. G21C 9/00
(52) U.S. Cl. ........................ 376/306; 376/309; 376/310; 252/625
(58) Field of Search ................................ 376/306, 309, 376/310; 252/625, 626

(56) References Cited

U.S. PATENT DOCUMENTS

| | | | | |
|---|---|---|---|---|
| 4,470,951 A | * | 9/1984 | Bradbury et al. | 376/310 |
| 4,705,573 A | * | 11/1987 | Wood et al. | 134/3 |
| 4,729,855 A | * | 3/1988 | Murray et al. | 134/2 |
| 4,950,449 A | * | 8/1990 | Petersen et al. | 376/306 |
| 5,089,216 A | * | 2/1992 | Schlonski et al. | 376/308 |
| 5,132,076 A | * | 7/1992 | Corpora et al. | 376/310 |
| 5,278,743 A | | 1/1994 | Bengel et al. | |
| 5,517,539 A | * | 5/1996 | Corpora et al. | 376/310 |
| 5,805,654 A | | 9/1998 | Wood et al. | |
| 5,901,368 A | * | 5/1999 | Wood et al. | 588/20 |

OTHER PUBLICATIONS

M.E. Pick et al, Chemical Decontamination of Water Reactors. CEGB Developments and the International Scene, CEGB, Berkeley Nuclear Laboratories, pp. 433–444.

* cited by examiner

*Primary Examiner*—Michael J. Carone
*Assistant Examiner*—R Palabrica

(57) ABSTRACT

A reactor coolant system of a pressurized water nuclear reactor with fuel assemblies in the core is simultaneously shutdown and decontaminated in less than 90 hours after the shutdown is initiated. A LOMI or Can-Derem decontamination reagent is added to reactor coolant to reduce iron and nickel in oxidized coatings before removing dissolved hydrogen and reducing the gamma emitting activity of the reactor coolant.

16 Claims, 1 Drawing Sheet

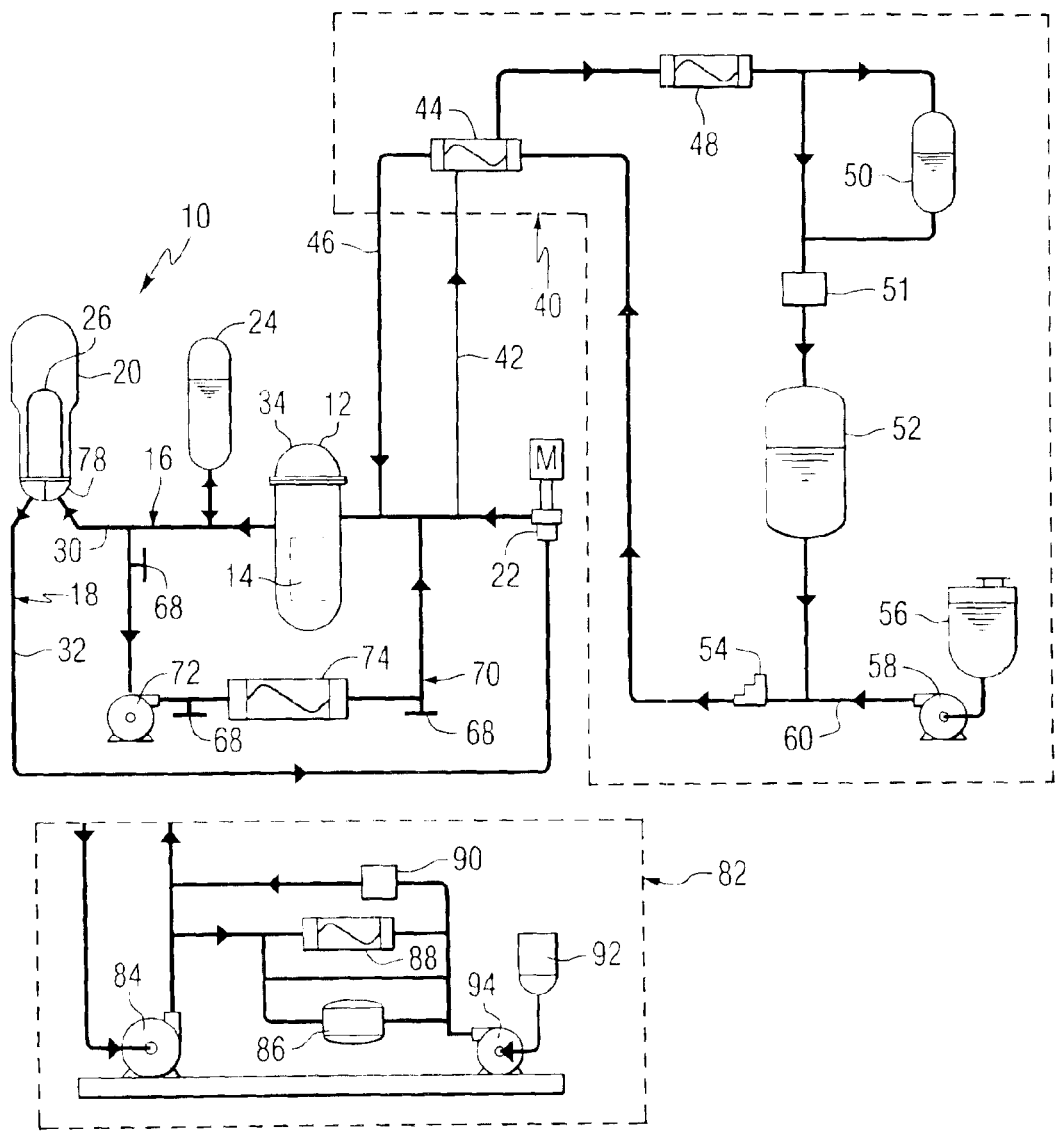
PRIOR ART

PRESSURIZED WATER REACTOR SHUTDOWN METHOD

CROSS REFERENCE

This application claims priority from Provisional Patent Application No. 60/408,729 filed Sep. 6, 2002 and Provisional Patent Application No. 60/409,175 filed Sep. 9, 2002.

BACKGROUND OF THE INVENTION

The invention relates to a method of shutting down pressurized water reactors (PWRs) and more particularly to a method of shutting down PWRs at the beginning of scheduled refueling and/or maintenance outages at the end of their fuel cycles.

Commercial PWRs are employed to generate steam for driving electrical generators. FIG. 1 illustrates a commercial PWR 10 generally represented by a reactor pressure vessel (RPV) 12 having a core region 14 wherein heat is generated by fuel assemblies (not shown) containing fissile materials. The RPV 12 is the principal component of a reactor coolant system (RCS) 16, which may include from two to four coolant loops operating in parallel (which loops are represented by one coolant loop 18). Each loop 18 includes a steam generator 20 and a main reactor coolant pump (RCP) 22 for circulating the reactor coolant between the RPV 12 and the steam generator 20. The reactor coolant in PWRs is essentially highly pure water with closely controlled amounts of boron and lithium, which vary throughout the course of a fuel cycle. Thus, the reactor coolant may contain up to about 2500 ppm boron and up to about 3 ppm lithium. In addition, the reactor coolant may also contain 5–50 ppb zinc. A pressurizer vessel (PV) 24 is piped with one of the loops 18 for controlling the pressure of the RCS 16. The RCS 16 may operated at temperatures of up to about 600° F. or more and at pressures of up to about 2200 psi or more. The RCP 22 may have a 6,000–9,000 horsepower motor for circulating the reactor coolant at a rate of about 100,000 gpm against a head of up to 250 feet of water or more between the RPV 12 (where the heat of the nuclear reaction is absorbed by the reactor coolant) and the primary side, or tube side, of a steam generator 20 (where the heat is transferred from the reactor coolant to the secondary side, or shell side, and the steam is generated).

The materials of construction of RCS 16 parts wetted by the high temperature, high pressure, reactor coolant are selected based upon their superior mechanical properties and corrosion resistance. Thus, the vessel liners and most of the piping in the RCS 16 (including hot leg piping 30 and cold leg piping 32) are fabricated of stainless steel. The tubing 26 in the steam generators 20 and nozzle penetrations (not shown) in the removable heads 34 of the RPVs 12 are generally fabricated of Alloy 600, Alloy 690 or Alloy 800. All of these alloys generally contain nickel, chromium and iron. The structural members of the fuel assemblies (not shown) in the core region 14 are generally fabricated from zirconium-base alloys containing niobium, iron and tin.

Despite the fact that the RCS 16 materials of construction are highly resistant to general corrosion, thin oxide coatings (or films) develop over time on the thousands of square feet of RCS surface area wetted by the reactor coolant during power operations. Thus, oxide coatings develop outside of the core region 14 (or, simply, out-of-core) on the piping 30,32 and vessels 12,20,24. Portions of the oxide coatings then dissolve into the circulating reactor coolant or are released into the reactor coolant in particulate form (at which point the dissolved and particulate coatings are considered as undesirable corrosion products).

The dissolved and particulate corrosion products are transported by the reactor coolant throughout the RCS 16 during the fuel cycles. A portion of these transported corrosion products deposit on the out-of-core surfaces and another portion of these transported corrosion products deposit on the fuel assemblies in the core region 14 in the RPV 12 where they are activated by the neutron flux.

In recent years the nuclear industry has increased the boiling duties on the fuel assemblies. The increased amount of boiling heat transfer has led to increased deposition of corrosion products on the heat transfer surfaces of the fuel assemblies. These corrosion products may become undesirably thick and impede heat transfer from the tube to the bulk of the reactor coolant, which is expected to result in elevated tube cladding temperatures. The elevated temperatures may induce cladding corrosion or failure of the cladding material. For example, these increases may lead to an increased corrosion rate because of an increased concentration of reactor coolant solutes (principally lithium and boron) by boiling within the corrosion deposits on the fuel assemblies. This increased deposition of corrosion products on the heat transfer surfaces of the fuel assemblies also may induce power shifts in the core region 14 by concentration of boron within the deposits (a condition known as axial offset anomaly).

In addition, the activated corrosion products in the core regions 14 dissolve in circulating reactor coolant or are released into the reactor coolant in particulate form and are transported out of the RPVs 12. These activated corrosion products then redeposit on the wetted surfaces of the balance of the RCS 16 out of the RPV 12. Undesirably, these redeposited activated corrosion products cause a build up of radiation fields outside of the RPV 12 where technicians will be working in the course of the outages.

Thus, the nuclear industry desires to reduce the amount of corrosion products circulating in the RCSs in order to: operate the PWR without power shifts during power operations; reduce failures of the fuel assembly tubes; and reduce the radiation exposure of workers during outages.

The nuclear industry's primary method for removing corrosion products is to purify a slip stream (or side stream) reactor coolant purification system while the PWR is generating power or the PWR is shutdown. System 40 generally illustrates a system commonly known in the industry as the chemical and volume control system (CVCS), which system is designed to control the chemistry and radiochemistry of the reactor coolant. CVCSs 40 are designed to continuously circulate and purify a slip stream at a nominal rate of about 100 gpm. Thus, about 100 gpm of reactor coolant flows out of the RCS 16 through piping 42, through a heat exchanger 44 for heating purified reactor coolant returning to the RCS 16 through return piping 46, through a water cooled heat exchanger 48, through an ion exchange vessel 50 for trapping corrosion products (including activated corrosion products) and a filter 51, and into a volume control tank (VCT) 52. In state of the art PWRs that maintain residual hydrogen concentrations in the reactor coolant during power operations, the VCTs 52 have a hydrogen gas blanket over the reactor coolant for maintaining the dissolved hydrogen concentration within a desired range.

The reactor coolant in the VCT 52 is then pumped by a positive displacement charging pump 54 at a nominal rate of about 100 gpm through the heat exchanger 44 and the piping 46 back to the RCS 16. In addition, boron in the form of boric acid may be made up as an aqueous solution in a boric acid feed tank 56 and pumped by a centrifugal feed pump 58 into the CVCS 40 for varying the boron concentration and thereby controlling the nuclear reaction in the RCS 16. Similarly, zinc in the form of zinc acetate or zinc borate may be made up as an aqueous solution and pumped into the CVCS 40 for developing and later maintaining a tight oxide coating on the wetted RCS surfaces and thereby reducing radiation levels and inhibiting stress corrosion cracking in the RCS 16. See e.g., U.S. Pat. Nos. 5,108,697 and 5,171,515.

At the end of the fuel cycles, substantial amounts of corrosion products remaining in RCSs 16 are removed in the course of refueling outages when spent fuel assemblies (and the corrosion products deposited thereon) are removed and replaced with fresh fuel assemblies. In addition, shutdown processes (including a state of the art shutdown process to be discussed in detail below) have been employed in attempts to remove additional amounts of corrosion products via the CVCSs 40 in a reasonable amount of time before removing the spent fuel assemblies. However, known commercial shutdown processes can not substantially reduce radiation fields generated in out-of-core oxidized coatings.

It has been estimated that less than about ten percent of the total amount of the corrosion products in a PWR are removed by the CVCSs 40, by commercial shutdown processes and by removal of the spent fuel assemblies. Thus, these steps may not be sufficient to prevent the power shifts experienced at higher fuel duties, prevent fuel failures or facilitate shutdowns with reduced radiation exposures.

Various decontamination methods for removing corrosion products (including activated corrosion products) from RCSs 16 have been proposed which would be applied to the RCSs 16 after the PWRs has been shutdown. See generally, Electric Power Research Institute Report NP-1168, entitled "Plant Decontamination Methods Review", May 1981; and M. E. Pick et al., "Chemical Decontamination Of Water Reactors, CEGB Developments And The International Scene", Nuclear Energy, Vol. 22, No.6, December 1983, pp.433–444. "Dilute chemical" decontamination methods (i.e., methods involving the use of aqueous solutions containing about one percent or less decontamination reagents) have been considered by the nuclear industry for decontaminating RCSs 16 with fuel assemblies permitted to remain in the core regions 14 of the reactor pressure vessels (RPVs). Advantageously, these methods can be implemented using the reactor coolant in the course of the decontamination steps and by connecting temporary decontamination systems to spool pieces 68 connected with the PWRs' residual heat removal systems (RHRSs) 70. RHRSs 70 generally include centrifugal circulation pumps 72 and heat exchangers 74 for (among other things) cooling the circulating reactor coolant while the PWRs 10 are shutdown and the steam generators 20 are isolated from the balance of the RCSs 16.

Two dilute chemical decontamination methods have been qualified and successfully used to decontaminate commercial PWRs or selected subsystems and components, including the LOMI (Low Oxidation State Metal Ion) Process licensed by the Electric Power Research Institute and the Can-Derem (and its predecessor Can-Decon) Process licensed by the Atomic Energy of Canada, Ltd. Both of these processes utilize a decontamination reagent including a reducing agent and a chelant. A "chelant" is a coordination compound having a central atom joined to two or more other atoms of one or more other molecules or ions (sometimes called ligands) such that heterocyclic rings may be formed with the central atom as part of each ring. Organic acids and their salts may be employed as chelants. LOMI reagents generally comprise vanadous picolinate in aqueous solution.

One LOMI reagent is a mixture generally comprising about 0.006 molar vanadous formate, 0.036 molar picolinic acid and sufficient sodium hydroxide to adjust the pH to a value between 4 and 5. Can-Derem reagents generally comprise ethylene diamine tetra acetate (EDTA) and citric acid in aqueous solution. One Can-Derem reagent is a mixture generally comprising 0.1 wt. % total sum of EDTA and citric acid and having a pH of between 2.3 and 3. These reducing agents are generally effective in reducing iron and nickel ions in the RCS oxide coatings from the +3 valence state to the +2 valence state in reasonable amounts of time. The LOMI reagents are normally more effective than the Can-Derem reagents in reducing the nickel ions. See, e.g., U.S. Pat. Nos. 4,470,951; 5,089,216 and 5,805,654.

Neither the LOMI Process nor the Can-Derem Process can effectively reduce chromium in RCS oxide corrosion products in a reasonable time period. Accordingly, the LOMI and Can-Derem Processes are normally performed as a series of steps with alternating chromium oxidation steps for oxidizing the chromium in the oxide coatings from the +3 valence state to the +6 valence state. One chromium oxidation process that has been qualified by the nuclear industry is the "AP" (or Alkaline Permanganate) Process, which utilizes a basic aqueous solution of potassium permanganate as an oxidizing agent with sodium hydroxide for controlling the pH. In a subsequent substep, oxalic acid or other reducing agent may be added to decompose the residual peroxide to protect the ion exchange resins. See, e.g., U.S. Pat. No. 5,278,743. Other chromium oxidation processes proposed by the nuclear industry include the NP and POD Processes, both of which employ aqueous solutions of potassium permanganate with nitric acid instead of a basic solution. These combined processes can remove up to 85% or more of the corrosion products on the wetted surfaces of RCSs 16.

Table 1 compares the key results of a full system decontamination of a commercial PWR having four loops 18 that was performed with the fuel assemblies removed from the core region 14 (including a five-step decontamination process (Can-Derem_AP_Can-Derem_AP_Can-Derem)) with the results of a state of the art shutdown process that was performed by the assignee of the present invention at several commercial PWRs having four loops 18:

TABLE 1

| Process | Curies Removed | Resin Volume (ft$^3$) Generated | Time (hrs) |
| --- | --- | --- | --- |
| Fuel-out 5-step Decontamination Process | 10,000 | 2,600 | 104 |
| State Of The Art Shutdown Process | 2,000– 6,000 | 30 | 40– 60 |

Table 1 shows that LOMI and Can-Derem chemical decontamination processes can be expected to remove substantially more activated corrosion products (and non-activated corrosion products) than can known shutdown processes (exemplified by the assignee's state-of-the-art process), but will generate considerably more waste and require considerably more time. Other PWR 10 decontamination applications have involved subsystems such as the RHRSs 70 or components such as steam generator channel heads 78. See, e.g., U.S. Pat. No. 5,517,539, which discloses a method of decontaminating a steam generator channel head 78.

The state of the art shutdown process was designed by the assignee of the present invention as part of an effort to complete refueling outages in less than about 20 days and to limit the radiation exposures of workers to less than 100 person rem, which is lower than exposures obtained with previously employed shutdown processes. It is noted that the public literature indicates that the shortest quartile of refueling outages in the United States in 2002 were completed in 23 days or less. Accordingly, the nuclear industry now expects future shutdowns to remove substantial quantities of corrosion products (including activated corrosion products) in approximately the same period of time as the state of the art shutdown process with accumulated radiation exposures of less than 100 person rem. In addition, the industry desires to decontaminate its PWRs with less wastes than were generated by the earlier full system decontamination and at much lower cost.

SUMMARY OF THE INVENTION

The above and other objectives may be achieved by the method of the present invention.

With these objectives in view, the present invention resides in a shutdown methodology for a pressurized water reactor (PWR) following interruption of power production operations for initiating a refueling outage or a maintenance outage. Advantageously, this methodology can be employed to decontaminate a reactor coolant system (RCS) including a reactor pressure vessel (RPV) having fuel assemblies in its core region within the context of a comprehensive shutdown/restart operation. This methodology broadly includes the steps of:

- cooling reactor coolant containing dissolved hydrogen in the RCS;
- adding boron to the reactor coolant in the RCS;
- adding a decontamination reagent into the boron-containing reactor coolant, the decontamination reagent including a reducing agent to reduce iron and nickel in the RCS and a chelant to complex the iron and the nickel;
- circulating the reactor coolant containing the decontamination reagent through the RCS, including through the RPV containing the fuel assemblies, to dissolve and complex the iron and the nickel;
- removing the complexed iron and nickel from the reactor coolant;
- after adding at least a portion of the decontamination reagent, degassing the RCS to remove hydrogen gas and then adding an oxidant to oxidize the residual dissolved hydrogen and decontamination reagent in the reactor coolant; and
- reducing the gamma emitting activity of the reactor coolant.

In a preferred practice of the present invention, a LOMI reagent comprising an aqueous vanadous picolinate solution is added to the reactor coolant and circulated through the RCS without a subsequent chromium oxidizing step or an additional LOMI step. This practice generates a chromium rich oxide coating on the wetted surfaces of the RCS that tends to be more corrosion resistant than the original oxide coating. In a version of this preferred practice, the single LOMI step is followed by the addition of zinc to the reactor coolant. The zinc may be added to the reactor coolant while the decontamination reagent is being added to the reactor coolant and/or while the oxidant is being added to the reactor coolant. Advantageously, the zinc will substitute for cobalt in the oxide coating.

BRIEF DESCRIPTION OF THE DRAWING

The invention as set forth in the claims will become more apparent from the following detailed description of certain preferred practices thereof which may be performed to shutdown pressurized water reactors (PWRs) shown, by way of example only, in the accompanying drawing.

DESCRIPTION OF THE PREFERRED PRACTICES

Commercial pressurized water reactors (PWRs) illustrated by PWR 10 are operated for twelve to twenty four month fuel cycles and then are shutdown for refueling outages. These PWR shutdowns are normally initiated by interrupting the power provided to the electrical grid.

Over the course of twelve to twenty four month fuel cycles, the chemistry of the reactor coolant is normally controlled within the range of about 1–2500 ppm boron and about 0.1–3.5 ppm lithium. At the end of fuel cycles, the boron and lithium concentrations are generally controlled at the low ends of their ranges. During power production operations, the reactor coolant may also be controlled at 2–50 cc (STP) dissolved hydrogen/kg water, at a pH of about 6.9–7.4 (depending upon the operating temperature) and at a conductivity of 1–30 $\mu$S/cm at 25° C. The coolant water may be at a temperature as high as about 590° F. or higher and at a pressure as high as about 2250 psi or higher.

State of the Art Shutdown Process

In the performance of the state of the art shutdown process developed by the assignee of the present invention mentioned above, delithiation of the reactor coolant preferably is started several hours before the power production is interrupted and may be continued until after reaching a zero power condition in order to lower the pH of the reactor coolant as promptly as possible. The reactor coolant is delithiated in order to attain acidic conditions for promoting dissolution of ferrites and other acid soluble species.

Soon after the power production is interrupted, boron is added to the reactor coolant in the RCS to suppress nuclear fission and the reactor coolant is acidified. These steps are preferably performed by the addition of boron in the form of boric acid.

The reactor coolant in the RCS 16 is cooled, preferably as rapidly as possible. The cooling step may be initiated before or after, but preferably shortly after, the initiation of the boron addition step. To facilitate rapid cooling, one or more of the RCPs 22 may be shutdown to reduce the heat input of the 6000+ horsepower RCP motors to a minimum. The last operating RCP 22 preferably is kept in service to assist fluid circulation and rapid cooling down to about 100° F. and then shutdown.

The reactor coolant may be circulated by a RCP 22 through the RCS 16 as the lithium is removed by hydrogen form ion exchange resin in ion exchange vessel 50, the boric acid is continually added and the temperature is reduced. Advantageously, the combination of these three steps lowers the reactor coolant pH into the acid range. The iron, nickel and radio-cobalt in the oxide coatings of the RCS begin to dissolve into the reactor coolant as the pH of the reactor coolant moves sufficiently into the acid range. The corrosion products in solution are continuously removed by the CVCS 40, which operates at a nominal rate of about 100 gpm. The reactor coolant flow through the CVCS 40 is maintained until the purification end point limits for radiochemical species have been achieved.

Also, shortly after initiation of a refueling shutdown, the atmosphere in the VCT 52 is purged with an inert gas such as nitrogen to remove the hydrogen gas. Then, hydrogen peroxide is added to the reactor coolant to react with any remaining dissolved hydrogen to guard against the creation of explosive gas spaces when the RCS is opened to the atmosphere. Later, additional hydrogen peroxide is added to the reactor coolant to provide for controlled oxygenation of the reactor coolant and oxidative decomposition of corrosion product deposits (including activated corrosion products) then residing on surfaces of the RCS 16 and the fuel assemblies.

The RPV head 34 may be lifted within about 65 to 90 hours of initiating the shutdown so that the PWR 10 can be refueled and restarted in about twenty days or less.

The Preferred Practice

Preliminarily, it is noted that optional preliminary steps may be performed several months before the power production is interrupted to initiate a shutdown. For example, in situations where LOMI reagents are to be employed in a decontamination step, the dissolved oxygen in the reactor coolant in the RHRS 70 may be reduced so that the dissolved oxygen will not consume the decontamination reagents in the course of the decontamination process. Thus, hydrazine may be added to the reactor coolant in the RHRS 70 to react with the dissolved oxygen. Alternatively, the RHRS 70 may be flushed with deoxygenated, borated water prior to the shutdown. In addition, dissolved oxygen may be removed from the water to be supplied for boration during the shutdown.

In the practice of the present invention, PWRs 10 can be shutdown, decontaminated and ready for lifting the RPV head 34 in about 90 hours or less after interruption of the power production. Advantageously, the fuel assemblies remain in the RPV 12 throughout the shutdown process.

In one preferred practice of the present invention, the early delithiation step of the prior art process is eliminated. If, for example, a LOMI decontamination process is to be employed to remove the iron and the nickel in the oxide coating on the wetted surfaces of a RCS 16, the lithium may be permitted to remain in the reactor coolant to offset the quantity of sodium hydroxide required for pH adjustment of the LOMI reagent, with the attendant savings in generated waste volume and time. In this practice, the lithium is later removed from the reactor coolant with the corrosion products. In practices where the early delithiation step of the prior art practice is eliminated, the PWR's CVCS 40 mixed resin bed in the lithium hydroxide form (which had been in service during power operation) may remain in service after interrupting the power and while cooling the reactor coolant down to about 180° F.–200° F. and then taken out of service in preparation for the addition of decontamination reagents such as LOMI reagents (as discussed below).

In the broad practice of the present invention, boron is added to the reactor coolant containing dissolved hydrogen in the RCS 16 to suppress nuclear fission. Like prior art practices, boron preferably is added in the form of an aqueous boric acid solution. Boration may be initiated within about an hour of initiating the shutdown. The refueling boron concentration may be reached in PWRs 10 having four loop RCSs 16 within about twenty one hours of initiating the shutdown.

In the broad practice of the present invention, the reactor coolant in the RCS is cooled, preferably as rapidly as possible. In one practice of the present invention, the reactor coolant may be cooled from about the 550° F.–620° F. range down to about the 200° F.–240° F. range or less at a maximum rate of about 80° F./hour. The reactor coolant temperature in a RCS 16 having four loops may fall to about 240° F. within about eight hours of initiating the shutdown. The cooling step of the present invention preferably cools the reactor coolant down to about 100° F.–120° F. or lower within about twenty hours, even with a temperature hold in the decontamination step as discussed below is employed.

In one preferred practice of the present invention, all of the RCPs 22 may continue to operate until near the end of the cooling step in order to most effectively circulate the reactor coolant throughout the RCS 16. However, the operating 6000+ horsepower RCPs 22 generate a considerable amount of heat that must be removed by the RHRS 70 so that the benefits of improved circulation must be balanced against the additional input of heat by the RCPs 22. Thus, in other practices, only some of the RCPs 22 continue to operate near the end of the cooling step.

In the broad practice of the present invention, a decontamination reagent is added into the boron-containing reactor coolant and most preferably is added in the course of the cooling step. (However, there may be a temperature hold on the reactor coolant cooling step while the decontamination reagent is being added.) Any acceptable dilute chemical decontamination process may be employed. The reagents may be added to the RCS 16 by a temporary unit, such as a skid-mounted decontamination unit 82 (having centrifugal circulation pumps 84, ion exchange tanks 86, heat exchangers 88, filters 90, make up tanks 92 and feed pumps 94), connected with spool pieces 68 in the RHRS 70. Such decontamination units 82 may be designed to operate at nominal flow rates of about 1,000 gpm to 1,500 gpm.

The decontamination reagent employed by the present invention generally includes a reducing agent to reduce iron in the oxide coatings of the RCS 16 and a chelant to complex the iron. A preferred decontamination reagent is a LOMI reagent comprising an aqueous vanadous picolinate solution. Advantageously, LOMI reagents can be added to reactor coolant at temperatures as high as about 180° F.–200° F. LOMI reagents are particularly effective in dissolving nickel and nickel activation products (such as cobalt-58) in addition to iron. Another preferred decontamination reagent is a Can-Derem reagent, which can be added to reactor coolant at temperatures as high as about 180° F.–240° F. Can-Derem reagents will also dissolve nickel and radio-cobalt.

In the broad practice of the present invention, reactor coolant containing the decontamination reagent is circulated through the RCS 16, including through the RPV 12 containing the fuel assemblies, to dissolve and complex the iron and, in addition, the nickel and radio-cobalt. Preferably, the reactor coolant is maintained within a temperature range that most effectively dissolves and complexes these metals without significantly decomposing the reagents or attacking the base metal. The reactor coolant may be held at a nominal temperature while the decontamination reagent is circulating. The decontamination reagent may be circulated until a sufficient amount of corrosion products and activated corrosion products have been dissolved. This may be established by a predetermined elevation in concentrations of dissolved corrosion products (including activated corrosion products). Thus, for example, the reactor coolant may be circulated for about twelve hours or more or until the predetermined limits for end point purification of the reactor coolant have been achieved. In addition, dead legs in the RCS piping may be bled to more effectively decontaminate the RCS 16.

In a preferred practice of the present invention, only one reducing decontamination step is performed and a chromium oxidation step is not performed. Most preferably, a single LOMI decontamination step is employed because LOMI reagents are particularly effective in reducing nickel. In this single step practice, a corrosion resistant, chromium rich, oxide coating having reduced reactivity remains on the wetted surfaces of the RCS 16. Because the chromium rich oxide coating will be relatively more corrosion resistant, it will be less susceptible to the dissolution, transport and redeposition of metal ions during subsequent fuel cycles. However, the oxide coating may retain up to 30%–40% or more of its initial activity after a single LOMI or Can-Derem step. To further reduce the activity of the oxide coating, zinc may be dissolved in the reactor coolant before or during the following fuel cycle to provide zinc ions. The zinc ions will substitute for the cobalt retained in the oxide coating and inhibit later deposition of cobalt.

After circulating the reactor coolant containing the decontamination reagents for a period of time, the complexed iron is removed from the reactor coolant. In addition, nickel, chromium, radio-cobalt, magnesium, zirconium, sodium, lithium and decontamination reagents also will be removed. Preferably, the reactor coolant is circulated through the decontamination unit 82 to remove these materials on ion exchange resins in tanks 86 and in filters 90. Advantageously, the decontamination unit 82 may operate at relatively high flow rates (1,000 gpm–1,500 gpm) compared with the CVCS 40 (about 100 gpm). At this time the decontamination reagent-containing reactor coolant may be cooled from the temperature at which the decontamination reagents are added down to about 180° F. or lower in order to not degrade the ion exchange resins. Preferably, the reactor coolant is cooled from the cooling water circulation temperature down to about 100° F. or lower.

In one ion exchange purification process, the anions and cations in the reactor coolant may be removed on mixed resin beds in ion exchange tanks 86. The ion exchange beds should be saturated with boric acid before use in the process so that the boron ions are not removed from the reactor coolant. The boron concentration should be monitored and boron should be added as needed to maintain the shutdown concentration. The particulates in the cooling water may be removed by filters. The circulating water may be cleaned up to the predetermined purification end point limits within about twelve hours of achieving the preferred concentrations of decontamination reagents for the preferred exposure time period.

In an alternative-exchange purification process, little or no anion exchange resin is used and the cation exchange resin is maintained in the H+ form. This will remove most of the corrosion products and sodium, yielding a boric acid solution containing (in the case of a LOMI decontamination step) picolinic acid and formic acid. The pH at this point will be between 2 and 3, which will further promote the dissolution of nickel from the RCS 16 and fuel assembly surfaces.

Once the reactor coolant from the ion-exchange purification process has reached an acceptable purification end point, e.g., when the iron, nickel, chromium and decontamination reagents such as vanadium (in the case of a LOMI decontamination step) have been reduced to below approximately 100 ppb or other target end point, the cooling water may be considered sufficiently clean and the ion exchange resins may then be bypassed.

In the broad practice of the present invention, RCS 16 is degassed to remove gaseous hydrogen after at least a portion of the decontamination reagent has been added. In one preferred practice, the hydrogen removal step is initiated toward the end of the decontamination reagent circulation step in order to conserve the decontamination reagent. Also, Can-Derem reagents may be more effective with a hydrogen overpressure. In this practice, the dissolved hydrogen concentration is preferably reduced mechanically, for example by spraying reactor coolant into an inert gaseous atmosphere in the VCT 52. The vapor space of the VCT 52 may be purged with an inert gas such as nitrogen to displace its hydrogen-containing atmosphere at any time after commencing the boron addition step. In one preferred practice, nitrogen introduction into the VCT 52 may be initiated within about two hours of initiating the shutdown. This step guards against the creation of flammable or explosive gas spaces. Advantageously, the simultaneous circulation of decontamination reagent and removal of hydrogen gas saves critical path time in the outage schedule.

In the broad practice of the present invention, an oxidant (and preferably a peroxide such as hydrogen peroxide) then is added to the reactor coolant to oxidize the residual decontamination reagents and hydrogen dissolved in the water. Organic compounds such as picolinic acid, formic acid or EDTA in the reactor coolant will be oxidized to produce carbon dioxide and ammonia and the carbon dioxide may be discharged through the volume control tank 52. In addition, this creates an oxidizing environment conductive to the dissolution of nickel and radio-active cobalt contained in the oxide remaining on the fuel assembly deposits. The temperature of the reactor coolant is preferably below about 180° F. at this time to reduce the susceptibility of the RCS 16 materials of construction to corrosion by the oxidant.

In the broad practice of the present invention, the gamma emitting radio-activity of the reactor coolant is reduced, preferably to a predetermined end point purification limit. Removal of residual corrosion products and radio-nuclides after the addition of the oxidant by mixed bed ion-exchangers and filters can achieve an end point purification limit of 0.05 microCuries/cc of total strong gamma emitting activity or less. End points of 0.05 microCuries/cc or less may be achieved by purification systems such as decontamination units 82 in about twelve hours or less.

Once the purification end limits are achieved, the decontamination unit and operating RCPs 22 may be secured, the RCS 16 depressurized and drained down to below the RPV head 34 so that the RPV head 34 can be lifted and removed to a remote stand in the refueling canal (not shown). Also, if desired, the CVCS 40 purification system can then be returned to service for continued coolant polishing.

In one practice of the present invention, a single step LOMI decontamination step may be performed without a subsequent chromium oxidizing step. The following Table 2 compares the results that may be expected from this particular practice with the above-discussed full system decontamination process and the state of the art shutdown process set forth of TABLE 1:

TABLE 2

| Process | Curies Removed | Resin Volume (ft$^3$) Generated | Time (hrs) |
| --- | --- | --- | --- |
| Fuel-in 5 step Decontamination | 10,000 | 2,600 | 104 |
| State Of The Art Shutdown Process | 2,000–6,000 | 30 60 | 40– |
| Preferred Practice Of The Invention | 6,000–10,000 | 800 | 24 |

Table 2 shows that substantially more radio-active material can be removed by the preferred practice of the present invention as compared with shutdown processes exemplified by the state of the art shutdown process and in substantially less time (albeit with the generation of relatively more waste). However, the preferred practice will generate substantially less waste compared with the prior art decontamination process. Thus, practices in accordance with the present invention can be ready for RPV head 34 lift off within about 90 hours or less of the initiation of a shutdown, which satisfies the expectations of the industry. In addition, practices in accordance with the present invention can result in total outage exposures of about 70 man-rem or less during shutdowns.

In other practices of the present invention where, e.g., shutdowns longer than twenty days can be scheduled, the decontamination step may be followed by one or more additional iron reducing steps with or without intermediate chromium oxidizing steps. However, these practices will result in additional generated wastes, time and expense.

In other practices of the present invention, zinc is added to the reactor coolant to condition the oxide coating. Advantageously, the zinc will substitute for the residual radio-active cobalt in the oxide coating and inhibit the additional deposition of radio-active cobalt, nickel and iron in the oxide coating during the following fuel cycle. The zinc may be added to the reactor coolant while the decontamination reagents are added, while the reagent-containing reactor coolant is circulating and/or while the oxidant is added. In these practices, reactor coolant containing about 5 ppb–100 ppb or more zinc may be circulated for about fifty hours or more to condition the oxide coatings on wetted surfaces of RCSs 16.

Thus, the shutdown method (or, as it also known, the shutdown chemistry method) of the present invention can reduce out-of-core radiation fields and reduce the deposition of corrosion products and activated corrosion products on out-of-core surfaces and fuel assembly surfaces, and can contribute to further shortening of outage durations.

While present preferred practices of the present invention have been described, it is to be understood that the invention may be otherwise variously embodied within the scope of the following claims of invention.

What is claimed is:

1. A shutdown method for a pressurized water reactor (PWR) following interruption of power operation, the PWR having a reactor coolant system (RCS) including a reactor pressure vessel (RPV) containing fuel assemblies, comprising the steps of:
    cooling reactor coolant containing dissolved hydrogen in the RCS;
    adding boron to the reactor coolant in the RCS;
    adding a decontamination reagent into the boron-containing reactor coolant, the decontamination reagent including a reducing agent to reduce iron and nickel in the RCS and a chelant to complex the iron and nickel;
    circulating the reactor coolant containing the decontamination reagent through the RCS, including through the RPV containing the fuel assemblies, to dissolve and complex the iron and nickel;
    removing complexed iron and nickel from the reactor coolant;
    while circulating the reactor coolant containing the decontamination reagent through the RCS to dissolve and complex the iron and nickel, degassing the RCS to remove hydrogen gas and then adding an oxidant to oxidize residual dissolved hydrogen and decontamination reagent in the reactor coolant; and
    reducing gamma emitting activity of the reactor coolant.

2. The method of claim 1 wherein the step of adding a decontamination reagent comprises: adding the decontamination reagent to the reactor coolant when the temperature of the reactor coolant in the RCS is between 180° F. and 240° F.

3. The method of claim 2, wherein the step of adding decontamination reagent comprises: adding the decontamination reagent the reactor coolant when the temperature of the reactor coolant in the RCS is between 240° F. and 200° F.

4. The method of claim 1 wherein the step of adding a decontamination reagent comprises: adding EDTA to reduce the iron and an organic acid to complex the iron.

5. The method of claim 1 wherein the step of adding a decontamination reagent comprises: adding an aqueous vanadous picolinate solution.

6. The method of claim 1 wherein the step of removing complexed iron comprises: removing complexed cobalt along with the complexed iron.

7. The method of claim 1 wherein the cooling water contains lithium and the step of removing complexed iron comprises: removing the lithium along with the complexed iron.

8. The method of claim 1 wherein the step of adding an oxidant comprises: adding hydrogen peroxide.

9. The method of claim 1 wherein the step of reducing the gamma emitting activity comprises: reducing the activity to 0.05 microCuries/cc or less.

10. The method of claim 1, wherein the PWR has a residual heat removal system (RHRS) connected with the RCS, including the additional step of: removing dissolved oxygen from reactor coolant in the RHRS before the step of introducing a decontamination reagent.

11. The method of claim 1, including the additional step of: adding zinc to the reactor coolant after interrupting the power operation and before restarting the PWR.

12. The method of claim 11, wherein the step of adding zinc comprises: adding zinc to the reactor coolant while adding the decontamination reagent to the reactor coolant.

13. The method of claim 12, wherein the step of adding zinc comprises: adding zinc to the reactor coolant while adding the oxidant to the reactor coolant.

14. The method of claim 11, wherein the method of claim 1 is followed by the zinc addition step of claim 11 without first oxidizing chromium in the RCS from a plus three valence to a plus six valence before adding the zinc.

15. The method of claim 11, wherein zinc is added to the reactor coolant after only one step of adding a decontamination reagent comprising an aqueous vanadous picolinate solution.

16. A shutdown method for a pressurized water reactor (PWR) following interruption of power operation, the PWR having a reactor coolant system (RCS) including a reactor pressure vessel (RPV) containing fuel assemblies, comprising the steps of:
    cooling reactor coolant containing dissolved hydrogen and lithium in the RCS;
    adding boron to the reactor coolant in the RCS;
    adding a decontamination reagent into the boron-containing reactor coolant, the decontamination reagent including a vanadous picolinate solution to reduce iron and nickel in the RCS and a chelant to complex the iron and nickel;

circulating the reactor coolant containing the decontamination reagent through the RCS, including through the RPV containing the fuel assemblies, to dissolve and complex the iron and nickel;

removing complexed iron and nickel from the reactor coolant;

while circulating the reactor coolant containing the decontamination reagent through the RCS to dissolve and complex the iron and nickel, degassing the RCS to remove hydrogen gas from the reactor coolant and then adding an oxidant to oxidize residual dissolved hydrogen and decontamination reagent in the reactor coolant;

reducing gamma emitting activity of the reactor coolant; and then without performing a chromium oxidation step subsequent to the step of adding the decontamination reagent including a vanadous picolinate solution to the reactor coolant, adding zinc to the reactor coolant before the completion of the oxidant addition step.

* * * * *